O. E. MILLIGAN.
STEERING DEVICE.
APPLICATION FILED APR. 10, 1914.

1,122,145.

Patented Dec. 22, 1914.
2 SHEETS—SHEET 1.

Witnesses
Frederick L. Fye.
P. M. Smith.

Inventor
Orrie E. Milligan.
By Victor J. Evans.
Attorney

O. E. MILLIGAN.
STEERING DEVICE.
APPLICATION FILED APR. 10, 1914.

1,122,145.

Patented Dec. 22, 1914.
2 SHEETS—SHEET 2.

Witnesses
Frederick L. Fox.
P. M. Smith.

Inventor
Orrie E. Milligan.

By Victor J. Evans.
Attorney

UNITED STATES PATENT OFFICE.

ORRIE E. MILLIGAN, OF ATTICA, INDIANA.

STEERING DEVICE.

1,122,145.  Specification of Letters Patent.  Patented Dec. 22, 1914.

Application filed April 10, 1914. Serial No. 831,045.

*To all whom it may concern:*

Be it known that I, ORRIE E. MILLIGAN, a citizen of the United States, residing at Attica, in the county of Fountain and State of Indiana, have invented new and useful Improvements in Steering Devices, of which the following is a specification.

This invention relates to automatic steering mechanism for farm tractors or traction engines especially when used for plowing purposes, the object in view being to produce simple mechanism in the form of an attachment for a traction engine, whereby the traction engine is automatically steered, the steering mechanism being under the control of a pilot or furrow wheel which travels in the furrow previously made by the plow drawn by the tractor.

A further object of the invention is to provide mechanism of such a character that when the furrow or pilot wheel leaves its furrow, the mechanism of this invention is thrown into a neutral condition so that it will have no further effect on the steering mechanism of the tractor, thus enabling the tractor to be manually steered by the operator for the purpose of bringing the plow back in position to form the next furrow or to enable the traction engine to be steered to any desired point.

With the above and other objects in view, the invention consists in the novel construction, combination and arrangement of parts, as will be hereinafter more fully described, illustrated and claimed.

Figure 1:
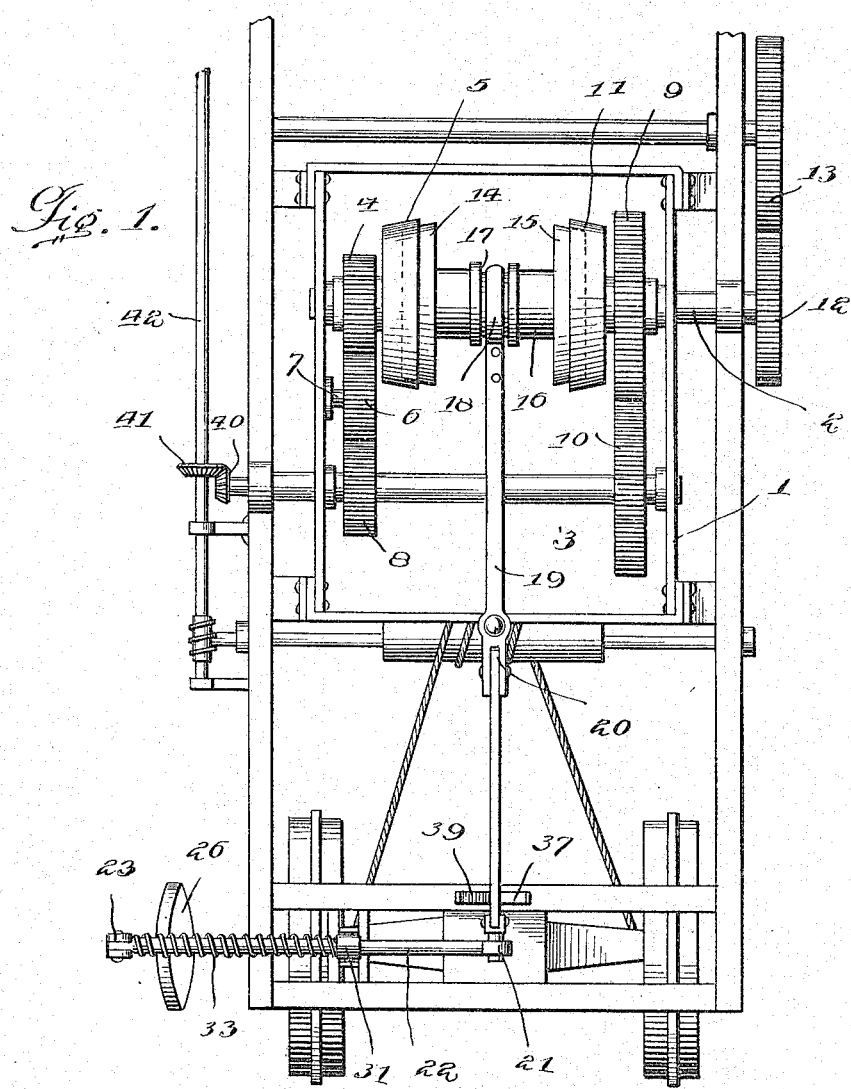
Figure 2:
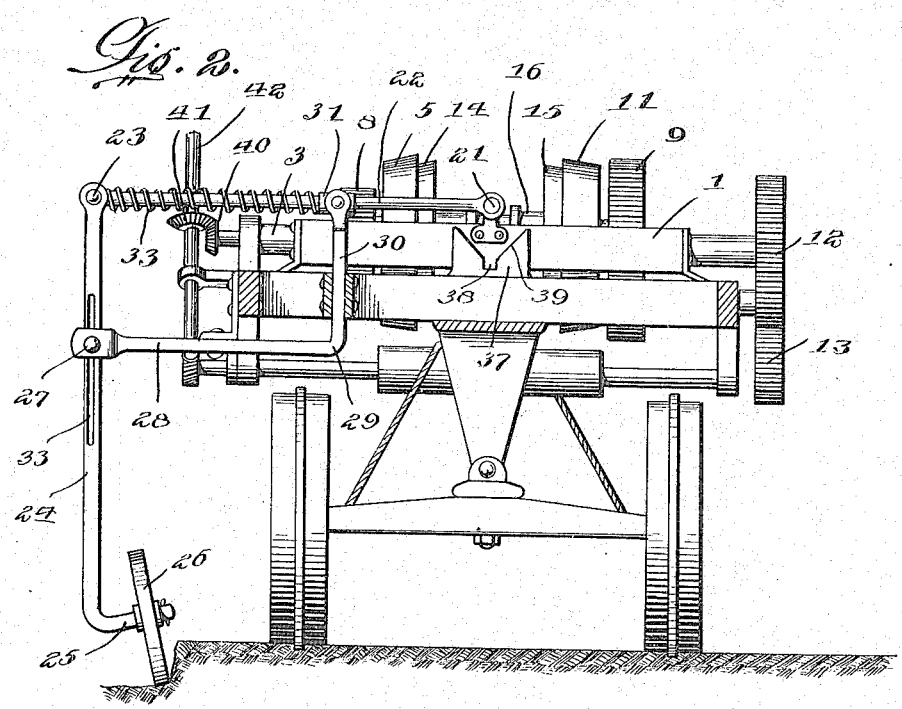
Figure 3:
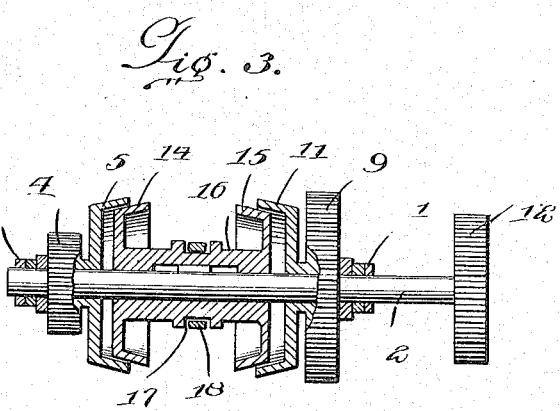

In the accompanying drawings: Figure 1 is a plan view of the steering attachment of this invention, showing the adjacent and coöperative parts of a traction engine. Fig. 2 is a vertical cross section through the same. Fig. 3 is a detail view of the clutch mechanism partly in section.

The automatic steering mechanism of this invention comprises essentially a frame 1 designed to receive a clutch shaft 2 and a countershaft 3 parallel to said clutch shaft as shown in Fig. 1. Loose on the shaft 2 is a spur gear wheel 4 having fixedly associated therewith a clutch member 5, the spur gear wheel 4 meshing with an intermediate idler spur gear wheel 6 journaled to rotate on a stud shaft 7 connected with the frame 1, the wheel 6 in turn meshing with and driving another spur gear wheel 8 fast on the countershaft 3, the shaft 3 being thus driven in the same direction as the shaft 2 by means of the gears 4, 6 and 8, when the wheel 4 is clutched to the shaft 2. Adjacent to the opposite end of the shaft 2 is another spur gear wheel 9 normally loose on the shaft 2 and meshing with and driving a spur gear wheel 10 fast on the countershaft 3, the countershaft 3 being thus driven in the reverse direction from the shaft 2 when the wheel 9 is clutched to the shaft 2. The wheel 9 bears a fixed relation to a clutch member 11 on the shaft 2. The shaft 2 is provided at one end with a gear wheel 12 which meshes with a similar gear wheel 13 fast on a shaft of the tractor or traction engine, the shaft 2 being thus constantly driven from a shaft of the traction engine. Coöperating with the clutch members 5 and 11 are other complementary clutch members 14 and 15 which are feathered and slidable longitudinally of the shaft 2, the clutch members 14 and 15 therefore revolving constantly with the shaft 2.

In the preferred embodiment of the invention the clutch members 14 and 15 are mounted upon a common sleeve or hub 16 which is grooved at 17 to receive a shifting fork 18 at the adjacent end of a clutch shifting lever 19. This lever 19 has a universal fulcrum at 20 on the frame 1 of the attachment and extends any suitable distance beyond the end of the frame 1 where it has a universal or loose pivotal connection at 21 with a connecting rod 22. The rod 22 is pivotally attached at its opposite end at 23 to the upper extremity of a knuckle arm 24 the lower end of which comprises a spindle 25 on which is journaled a pilot or furrow wheel 26 adapted to travel in a furrow as indicated in Fig. 2 so as to influence the steering mechanism in a manner which will become apparent.

The knuckle arm 24 has a pivotal connection at 27 with the horizontally extending arm 28 of a bracket 29 connected fixedly to the frame or platform of the traction engine, said bracket also comprising a vertical arm or extension 30 formed with an opening 31 through which the connecting rod 22 passes and also through which said rod is adapted to slide, the rod 22 being normally pressed in one direction by means of a coiled expansion spring 32 which encircles the rod 22 between the extension or arm 30 of the bracket and the pivotal connection or knuckle 23 at the upper extremity of the knuckle arm 24. The knuckle arm 24 is further provided with a longitudinal slot 33 to receive the pivot pin 27, thus enabling the arm 24 to rise and descend as the furrow wheel 26 enters or leaves a furrow. When the wheel 26 is elevated by running out of a furrow, the knuckle arm 24 moves upwardly and acts on the connecting rod 22 as a lever thus depressing the pivoted end 21 of the clutch throwing lever 19 until it is received in a fixed keeper 37 which is shown as formed with a central notch 38 and reversely sloping and downwardly converging centering edges or faces 39 which serve to direct the lever 19 into the central notch 38. When the lever 19 is engaged in the notch 38, both of the clutch members 14 and 15 are sustained out of engagement with the clutch members 5 and 11 and the steering mechanism of this invention is then rendered inoperative. The operator may then employ the usual steering mechanism for directing the machine to the next desired point of operation. As soon as the wheel 26 again enters a furrow, the knuckle arm 24 moves downwardly and thereby carries the clutch lever 19 out of engagement with the keeper 37. This places the mechanism in full operative position again and as the wheel 26 is moved to one side or the other relatively to the normal direction of movement of the traction engine, the clutch operating lever 19 is correspondingly moved to throw one or the other of the clutches into operation. When either of said clutches is in operation, movement is imparted from the countershaft 3 through the medium of miter gears 40 and 41 or their equivalent to the usual steering shaft 42 of the traction engine, the steering shaft being connected by any usual or preferred means to the steering wheel or wheels of the machine.

From the foregoing description it will be seen that the attachment of this invention when applied to a traction engine drawing a plow or other farming implement producing a furrow, renders the steering of the tractor perfectly automatic and requires no attention on the part of the operator except at the end of the furrow when the steering attachment is automatically thrown out of operation.

What I claim is:—

1. Automatic steering mechanism for farm tractors, comprising a clutch shaft driven constantly by the tractor, a countershaft parallel to said clutch shaft and geared to the steering shaft of the tractor, clutches on the first named shaft geared to said countershaft in such manner as to drive the latter in either direction, a clutch throwing lever, a furrow controlled wheel connected with said lever and acting to swing said lever, and means for holding said lever neutral when the furrow wheel leaves its furrow.

2. Automatic steering mechanism for farm tractors, comprising a clutch shaft driven constantly by the tractor, a countershaft parallel to said clutch shaft and geared to the steering shaft of the tractor, clutches on the first named shaft geared to said countershaft in such manner as to drive the latter in either direction, a clutch throwing lever having a universal fulcrum joint, a furrow wheel, a knuckle arm by which said wheel is carried having an up and down movement and also a pivotal action, a connecting rod between said lever and knuckle arm, said rod being pivotally supported between its ends, and a stationary keeper adapted to engage said lever and hold it neutral when the furrow wheel is elevated.

In testimony whereof I affix my signature in presence of two witnesses.

ORRIE E. MILLIGAN.

Witnesses:
 ALONZO P. GREEN,
 WILL A. McCONNELL.

Copies of this patent may be obtained for five cents each, by addressing the "Commissioner of Patents, Washington, D. C."